United States Patent
Tsuzuki et al.

(10) Patent No.: US 11,407,304 B2
(45) Date of Patent: Aug. 9, 2022

(54) WORK VEHICLE HOSE ROUTING

(71) Applicant: ISEKI & CO., LTD., Ehime-ken (JP)

(72) Inventors: Yoshihisa Tsuzuki, Ehime-ken (JP); Ryota Nagano, Ehime-ken (JP)

(73) Assignee: ISEKI & CO., LTD., Matsuyama (JP)

( * ) Notice: Subject to any disclaimer, the term of this patent is extended or adjusted under 35 U.S.C. 154(b) by 0 days.

(21) Appl. No.: 17/202,574

(22) Filed: Mar. 16, 2021

(65) Prior Publication Data
US 2021/0291638 A1 Sep. 23, 2021

(51) Int. Cl.
*B60K 11/02* (2006.01)

(52) U.S. Cl.
CPC .................................. *B60K 11/02* (2013.01)

(58) Field of Classification Search
CPC .......... B60K 11/02; B60K 11/00; B60K 11/04
See application file for complete search history.

(56) References Cited

U.S. PATENT DOCUMENTS

2017/0226715 A1* 8/2017 Ota ...................... E02F 9/0883

FOREIGN PATENT DOCUMENTS

JP        2017-178044        10/2017

* cited by examiner

*Primary Examiner* — Jacob M Amick
(74) *Attorney, Agent, or Firm* — Finnegan, Henderson, Farabow, Garrett & Dunner, LLP

(57) ABSTRACT

A work vehicle in which hoses and the like are easy to handle and adequate routing of these hoses is possible. The work vehicle includes a traveling body which includes: traveling devices; and a connecting section which is configured to connect a working machine to the traveling body. The traveling body includes: a pair of left and right body frames which extends longitudinally; an engine which is mounted on the body frames and works as a driving source of the traveling devices and the working machine; a base plate which is provided on the body frames; a cooler which is provided on the base plate; and hoses which are connected to the cooler and routed, the base plate has a hose insertion hole into which the hoses are inserted, and the hoses pass through the hose insertion hole, extend below the base plate, and are routed toward the engine.

9 Claims, 10 Drawing Sheets

WORK VEHICLE HOSE ROUTING

CROSS REFERENCE TO RELATED APPLICATIONS

This application claims priority to Japanese Patent Application No. 2020-046389, filed Mar. 17, 2020, the disclosure of which is incorporated herein by reference in its entirety.

BACKGROUND

The present invention relates to a work vehicle.

Heretofore, work vehicles having the following configuration with a routing structure of hoses connected to an oil cooler have been known. Specifically, this structure is such that an oil cooler is disposed on a base plate which is provided on left and right body frames, and oil hoses which are connected to this oil cooler are drawn out downward through a hole which is provided eccentrically with respect to any one of the left and right sides of the base plate and are routed along the outer side of a frame (see JP-A-2010-174855).

However, since a main harness connected to a battery, an air conditioner hose connected to a capacitor, and the like are also routed on the outer side of the body frame, the bundle of these hoses and harnesses is so large as to be difficult to handle, which makes it hard to route them tidily.

SUMMARY

The present invention has been made in view of the above, and aims to provide a work vehicle in which hoses, harnesses and the like are easy to handle and adequate routing of these hoses and harnesses is possible without impairing its external appearance.

In order to solve the problem and achieve the objective described above, a work vehicle according to an aspect includes a traveling body which includes: traveling devices; and a connecting section which is configured to connect a working machine to the traveling body, in which the traveling body includes: a pair of left and right body frames which extends longitudinally; an engine which is mounted on the body frames and works as a driving source of the traveling devices and the working machine; a base plate which is provided on the body frames; a cooler which is provided on the base plate; and a hose which is connected to the cooler and routed, the base plate has a hose insertion hole into which the hose is inserted, and the hose passes through the hose insertion hole, extends below the base plate, and is routed toward the engine.

According to the work vehicle according to the aspect, the hose connected to the cooler can be routed between the left and right body frames, and thus adequate routing is possible without impairing the external appearance of the vehicle.

DESCRIPTION OF EMBODIMENTS

Hereinbelow, an embodiment of a work vehicle disclosed in the present application is described in detail with reference to the accompanying drawings. Note that, the following embodiment is not intended to limit this invention.

Figure 1:
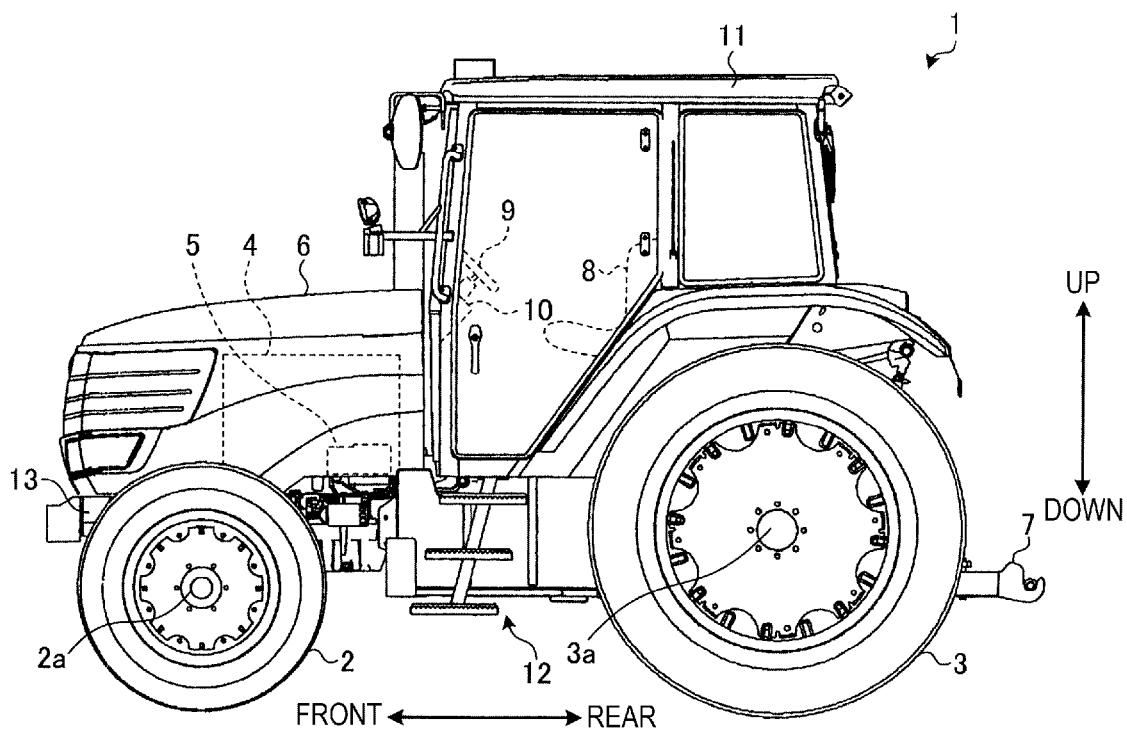
FIG. 1 is a side view of a tractor which is a work vehicle according to one embodiment.

First, the overall configuration of a tractor which is a work vehicle according to the embodiment is described with reference to FIG. 1. FIG. 1 is a side view of the tractor.

The tractor is an agricultural tractor which performs work while traveling by itself in a location such as an agricultural field. In addition, the tractor is capable of performing predetermined work while traveling in an agricultural field with a driver (also referred to as an operator) on board.

Note that, in the following description, a longitudinal direction of the tractor indicates a straight travel direction of the tractor. In the straight travel direction of the tractor, a forward travel direction of the tractor means advancing in a direction from a driver's seat 8 toward a steering wheel 9, and a reverse direction thereof is a reverse travel (backward travel) direction. In addition, forward and backward of the tractor are defined based on the forward travel direction.

Meanwhile, a lateral direction indicates a direction horizontally orthogonal to the longitudinal direction. Here, left and right are defined with respect to the "front" side in the longitudinal direction. Specifically, in a state in which the operator is seated on the driver's seat 8 and directed forward, "left" indicates the left-hand side and "right" indicates the right-hand side. Further, a vertical direction indicates a direction orthogonal to the longitudinal direction and the lateral direction. Accordingly, the longitudinal direction, the lateral direction and the vertical direction are three-dimensionally orthogonal to each other.

As illustrated in FIG. 1, the tractor includes a traveling body 1 including: front wheels 2 and rear wheels 3 which work as a drive unit; and a connecting section 7 which is configured to connect a working machine to the traveling body. The traveling body 1 further includes: an engine 4; a hood 6 which houses the engine 4 therein; and a cabin 11 which has a manipulating section. These are built up on a pair of left and right body frames 13 which works as a main frame of the traveling body 1. A step 12 for boarding to the cabin 11 is disposed between the front wheels 2 and the rear wheels 3. The hood 6 is openably and closably provided in a front part of the traveling body 1 and covers the engine 4 in a closed state.

The front wheels 2 are provided in pairs on the left and right sides, located in the front part of the traveling body 1, rotatably connected to an axle 2a, and work as steering wheels. The rear wheels 3 are provided in pairs on the left and right sides, located in a rear part of the traveling body 1, and rotatably connected to an axle 3a.

Although the front wheels 2 and the rear wheels 3 are a four-wheel drive (4WD) traveling device with both of them working as driving wheels in this embodiment, only the rear wheels 3 may be used as driving wheels instead. Note that, the tractor may alternatively have a configuration including, as a traveling device, a crawler track instead of the rear wheels 3.

The engine 4 is a driving source of the tractor and is a thermal engine such as a diesel engine and a gasoline engine. Power (rotational power) transmitted from the engine 4 covered with the hood 6 is decelerated as appropriate by a transmission (transmission mechanism) (not illustrated), and is transmitted to the front wheels 2 and the rear wheels 3 and to a PTO (Power Take-off) (not illustrated).

In addition, as illustrated in FIG. 1, the cabin 11 is provided in an upper part of the traveling body 1, and the manipulating section provided inside the cabin includes components such as: the driver's seat 8 which is a seat for a driver; and the steering wheel 9 by means of which the front wheels 2 are steerable by the driver's manipulation. The steering wheel 9 stands on a dashboard 10 which is provided, on its upper surface, with a display (meter panel) for displaying various information thereon. Note that, in the manipulating section, various types of levers such as a main shift lever, a sub-shift lever, a forward-backward travel lever, and an accelerator lever (not illustrated) are arranged near the steering wheel 9. In addition, components such as a brake pedal, a tilt pedal, an accelerator pedal, and a clutch pedal (not illustrated) are arranged in a region ahead of and below the driver's seat 8.

Note that, although the manipulating section of the tractor according to this embodiment is provided inside the cabin 11, the tractor may be an open-type tractor without the cabin 11.

Meanwhile, the engine 4 includes an EGR (Exhaust Gas Recirculation) system 5 which is configured to recirculate a part of exhaust gas toward the intake side of the engine 4. The EGR system 5 is provided for the purpose of reducing nitroxide (NOx) in the exhaust gas and improving fuel consumption.

Figure 2:
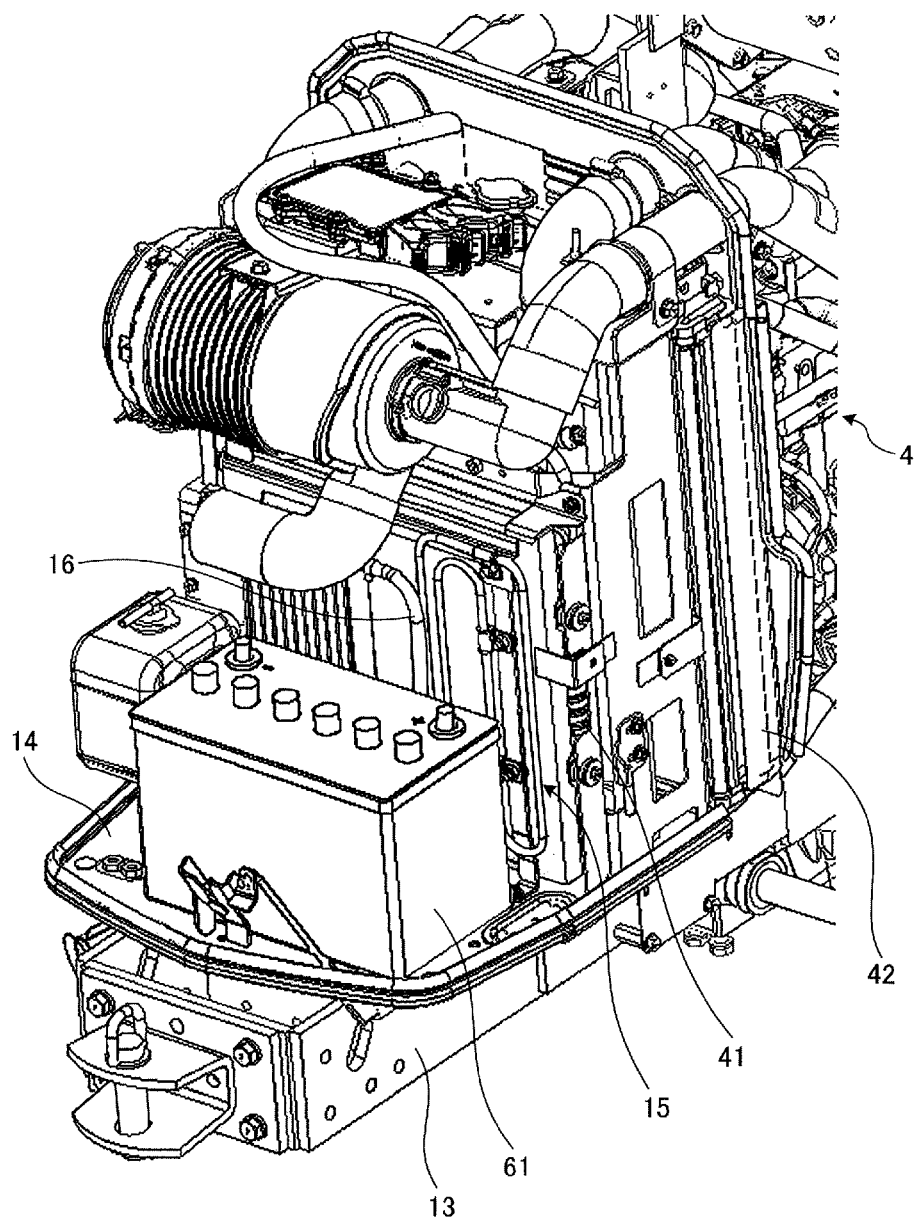
FIG. 2 is an explanatory view illustrating a front area of an engine room.
Figure 3:
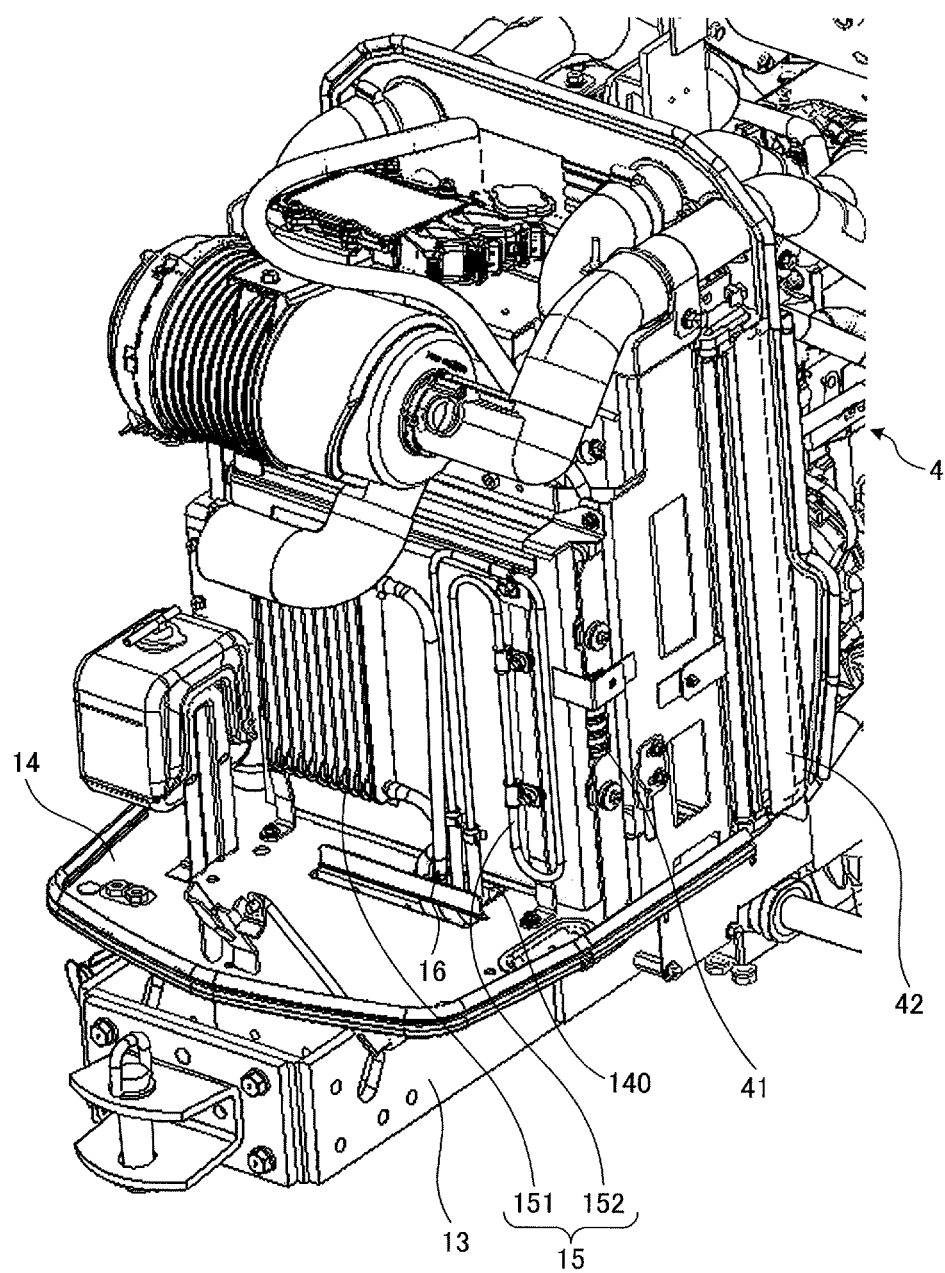
FIG. 3 is an explanatory view illustrating the front area of the engine room with a battery detached therefrom.

FIG. 2 is an explanatory view illustrating a front area of an engine room. FIG. 3 is an explanatory view illustrating the front area of the engine room with a battery 61 detached from that of FIG. 2. The engine room is formed inside the hood 6.

As illustrated in FIG. 2, in the front area of the engine room, a base plate 14 is provided on the pair of left and right body frames 13, 13, and the battery 61, a fuel cooler 15 as a cooler, a capacitor 41, and a radiator 42 are arranged on this base plate 14 in this order from the front side.

The fuel cooler 15 is configured to cool down fuel, such as diesel oil, for improving the combustion state of the engine 4, and is disposed between the battery 61 and the capacitor 41. Note that, the capacitor 41 is configured to cool down a refrigerant of an air conditioner (not illustrated). The radiator 42 is configured to cool down cooling water of the engine 4.

In this embodiment, the fuel cooler 15 includes a first fuel cooler 151 and a second fuel cooler 152 which are arranged in parallel in the vehicle-body width direction. The first fuel cooler 151 is provided on the side where fuel is supplied from a fuel tank (not illustrated) to the engine 4, whereas the second fuel cooler 152 is disposed on the side where excess fuel of the fuel supplied to the engine 4 returns to the fuel tank.

Since the cooler is laid out as described above in the front area of the engine room, it is possible to effectively use a limited space inside the engine room. In addition, since the fuel cooler 15 has a configuration including the first fuel cooler 151 and the second fuel cooler 152, it is possible to keep the temperature of the fuel within a predetermined temperature range, and thus meet a predetermined fuel temperature standard.

Note that, although both the capacitor 41 and the radiator 42 are also heat exchangers that work as a cooler as well as the first fuel cooler 151 and the second fuel cooler 152, the fuel cooler 15 is defined as the cooler in this embodiment for the sake of convenience.

As illustrated in FIG. 3, a hose insertion hole 140 is formed in the base plate 14 at a position behind a space where the battery is placed. In other words, multiple hoses 16 that extend while being connected to the first fuel cooler 151 and the second fuel cooler 152 are inserted into the hose insertion hole 140 to extend below the base plate 14. Then, these hoses 16 are routed to the engine 4 side, e.g., toward the rear of the vehicle body. Thereby, the hoses 16 are routed inside the left and right body frames 13, 13 without sticking out outward (e.g., the hoses 16 are internally routed).

In this way, the hoses 16 extending from the fuel cooler 15 pass through the hose insertion hole 140 to be drawn out from the high-temperature engine room toward the outside which is lower in temperature than the inside of the engine room, which prevents unnecessary temperature rise of fuel having been cooled down in the fuel cooler 15. In addition, this prevents the hoses 16 from sticking out outside the body frames 13, 13, and thus the external appearance is not impaired.

Figure 4:
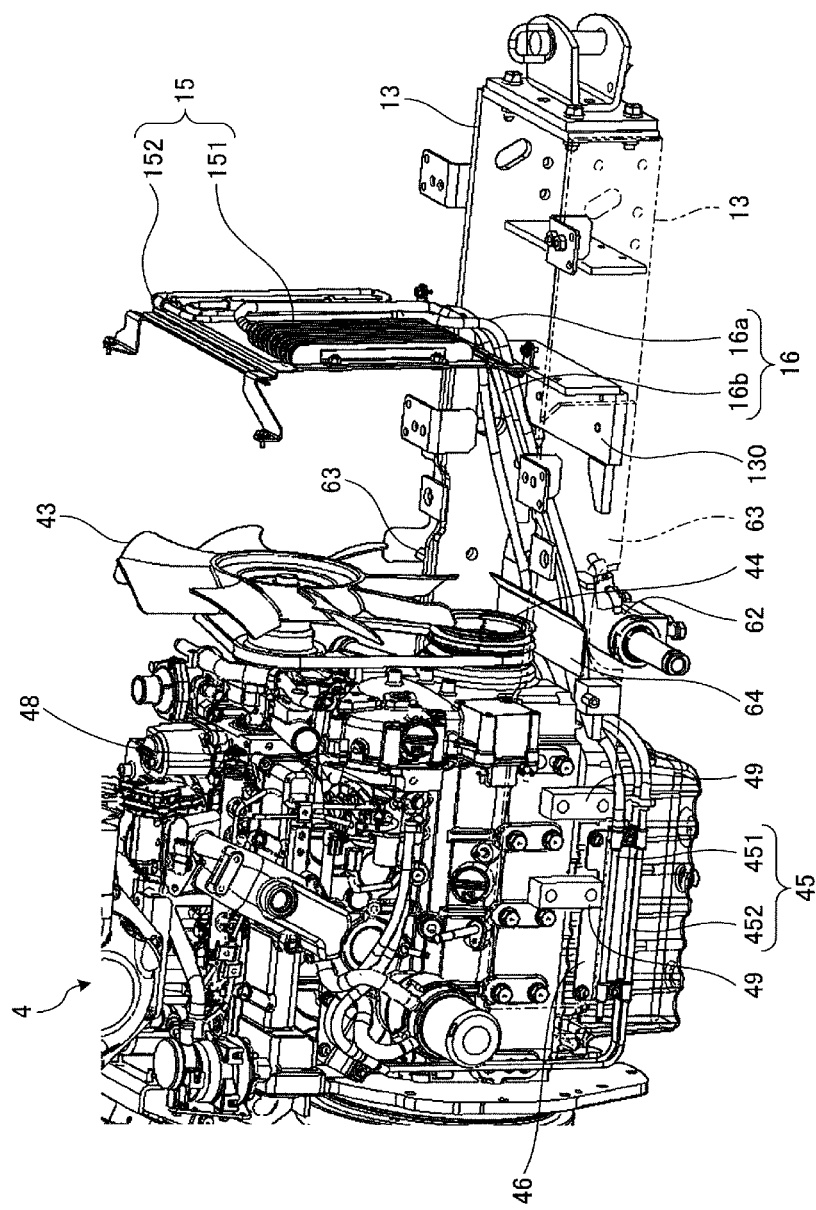
FIG. 4 is an explanatory view illustrating a routing state of hoses which connect a cooler and an engine to each other.
Figure 5:
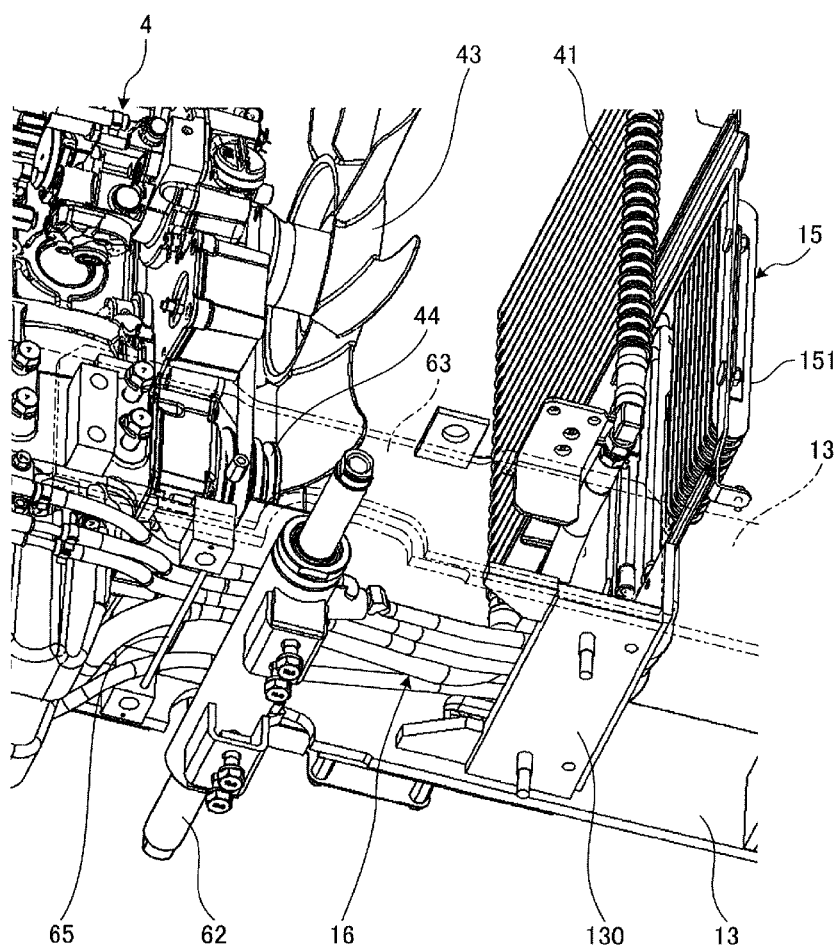
FIG. 5 is an explanatory view illustrating the routing state of the hoses at a position near a steering cylinder.
Figure 6:
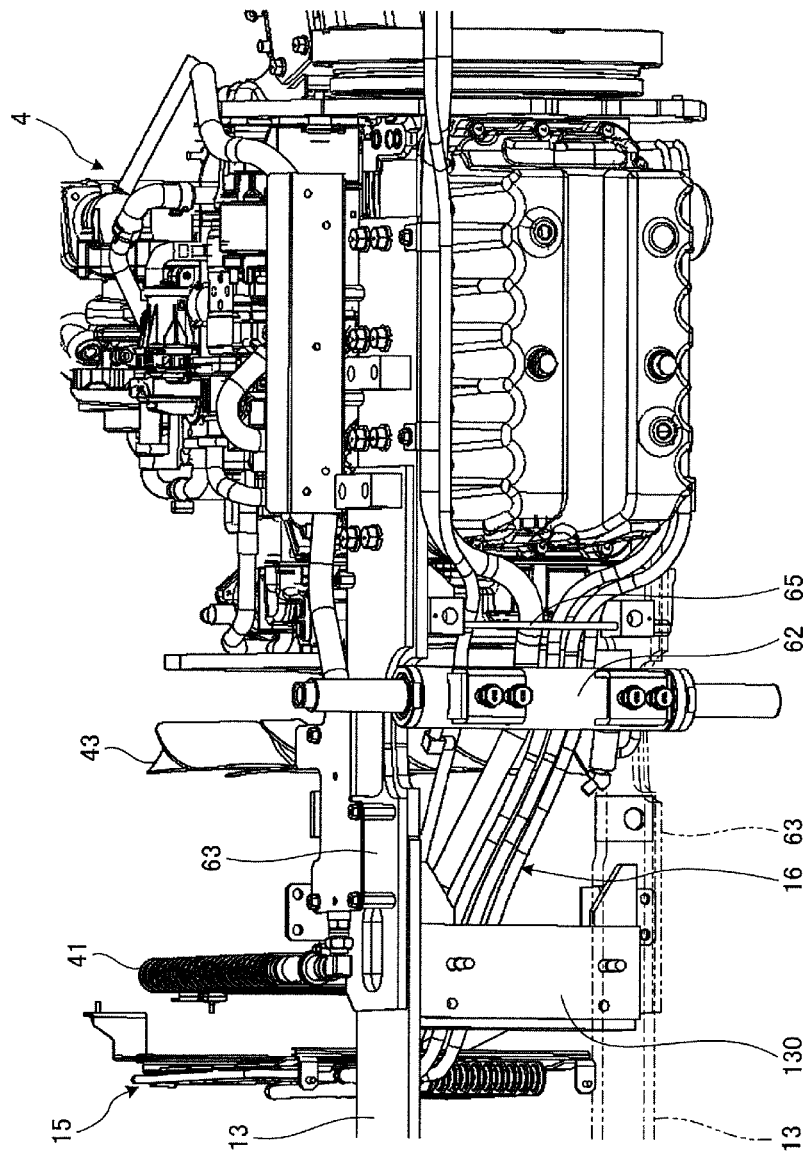
FIG. 6 is an explanatory view in which the engine room is viewed from obliquely below.
Figure 7:
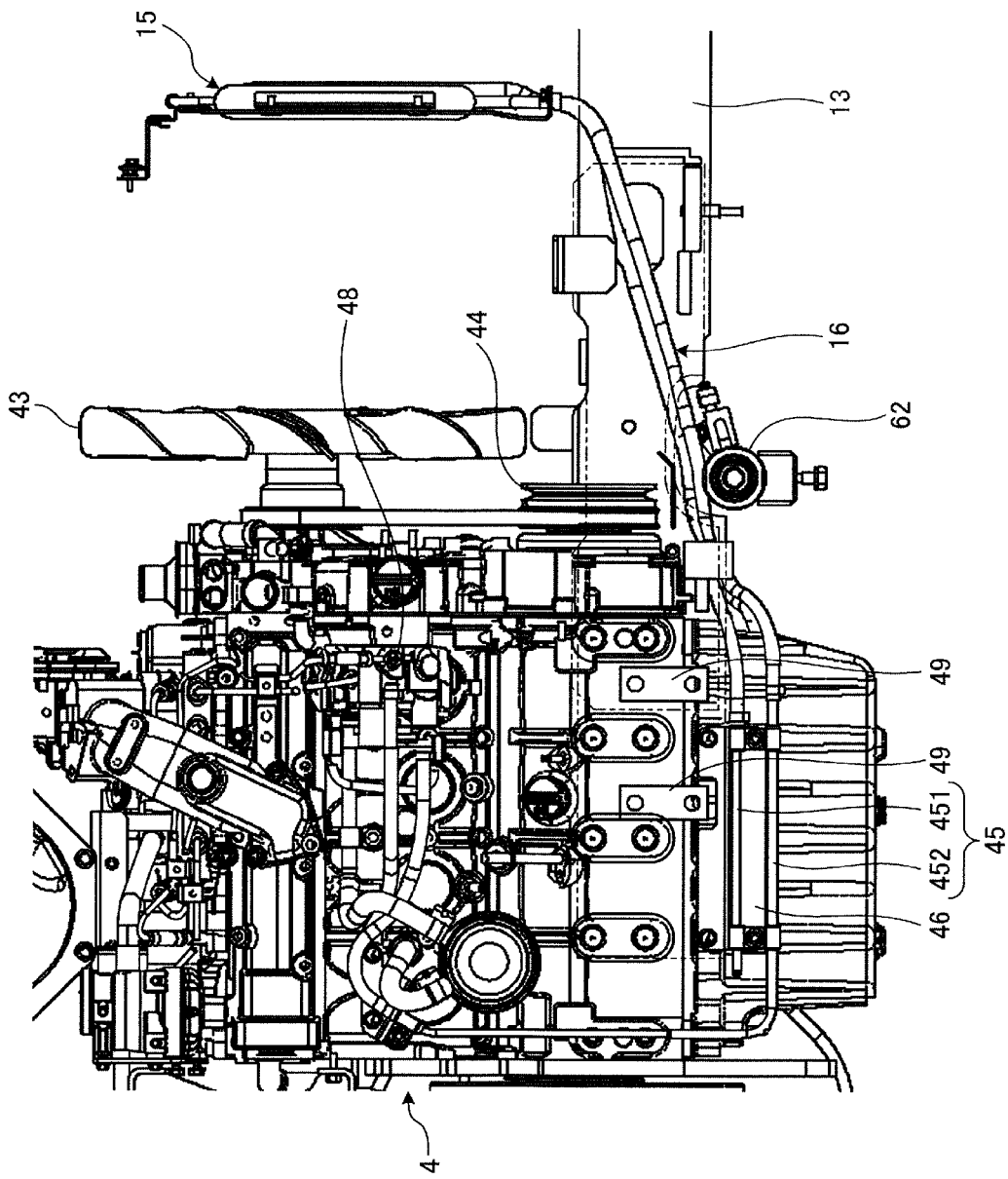
FIG. 7 is a right side view of the inside of the engine room which is partially not illustrated.

A more detailed description is given of how the hoses 16 are routed with reference to FIGS. 4 to 7. FIG. 4 is an explanatory view illustrating a routing state of the hoses 16 which connect the cooler (the fuel cooler 15) and the engine 4 to each other. FIG. 5 is an explanatory view illustrating the routing state of the hoses 16 at a position near a steering cylinder. Meanwhile, FIG. 6 is an explanatory view in which the engine room is viewed from obliquely below, and FIG. 7 is a right side view of the inside of the engine room which is partially not illustrated.

As illustrated in FIG. 4, the hoses 16 extending from the fuel cooler 15 are routed in such a way as to pass above a reinforcing frame 130, which is located below the hose insertion hole 140 (see FIG. 3), and pass through a region between: a steering cylinder 62 which is configured to steer the front wheels 2 as the steering wheels; and a crank pulley 44 which is provided in the engine 4. Note that, in FIGS. 4 to 7, reference sign 43 indicates a radiator fan which is rotated via a belt by the rotation of the crank pulley 44.

A hose cover 64 is disposed between the hoses 16 and the crank pulley 44. This hose cover 64 is constituted of a plate that is hung between axle brackets 63, 63 mounted respectively on the left and right body frames 13, 13, and also functions as a reinforcing member for the axle brackets 63, 63.

In addition, as illustrated in FIGS. 5 and 6, a guide member 65 formed of a round bar is hung between the left and right body frames 13, 13 in such a way as to be located between the engine 4 and the steering cylinder 62. Further, the hoses 16 are routed in such a way as to pass a region between the guide member 65 and the hose cover 64 (see FIG. 4).

Such a configuration can limit the area where the hoses 16 are routed, whereby the hoses 16 can be routed in a stable position.

In addition, as illustrated in FIG. 4 and FIG. 7, a relay pipe 45 which is adapted to relay the hoses 16 and connect them to the engine 4 is disposed in a lower part of a right-side wall of the engine 4. The relay pipe 45 is constituted of: a first pipe 451 which extends linearly; and a second pipe 452 which is formed to bend in a substantially L-shape.

As illustrated in the drawings, the first pipe 451 and the second pipe 452 are arranged in two rows in a lengthwise direction with the first pipe 451 located on the upper side.

In this embodiment, the first pipe 451 has one end (the left end in the drawings) connected to the fuel tank (not illustrated) via a fuel filter (not illustrated) and the other end (the right end in the drawings) connected to a hose 16a which is connected to the IN side of the first fuel cooler 151. Meanwhile, the second pipe 452 is disposed below the first pipe 451, and has one end (the left end in the drawings) connected to a fuel pump 48 (see FIG. 4 and FIG. 7) and the other end (the right end in the drawings) connected to a hose 16b which is connected to the OUT side of the first fuel cooler 151.

In addition, the first pipe 451 and the second pipe 452 are mounted on a pipe support bracket 46 which is secured to a side surface of the axle bracket 63. Such a configuration can prevent interference with a working machine, such as a front loader, which is mounted to the front side of the tractor.

In this way, by using the relay pipe 45, it is possible to shorten the length of the hoses 16 and thus reduce their cost. In addition, since the second pipe 452 can be constituted of the same component, it is possible to reduce the types of components.

Meanwhile, it is preferable that the first pipe 451 and the second pipe 452 be made of the same material as the fuel cooler 15. This can help reduce the temperature of fuel in an area outside the engine room as well as in the fuel cooler 15.

It is also preferable that the hoses 16 and the relay pipe 45, which are connected in an area between the fuel filter (not illustrated) and the fuel pump 48 (see FIG. 4 and FIG. 7), be arranged in such a way as to be located at a position as low as possible relative to an intake port of the fuel pump 48 of the engine 4. This can prevent the air from being retained inside the hoses 16 and the like and prevent rotational fluctuation which might otherwise occur when the retained air is sucked into an injection pump.

The hoses 16 described above are routed on the right side of the engine 4. Hoses and harnesses to be routed on the left side of the engine 4 are preferably routed along the axle bracket 63. Note that, when front loader mounting sections 49, 49 (see FIG. 4 and FIG. 7) are provided to the axle brackets 63, such hoses and harnesses are preferably routed below and inward of the front loader mounting sections 49, 49. Such routing prevents the hoses and harnesses from hampering the mounting of the front loader, whereby the hoses and harnesses can be reliably kept routed in a tidy fashion.

Note that, the above hoses and harnesses can also be routed along guides that are mounted above the front loader mounting sections, for example. In this case, it is preferable that the hoses and harnesses routed along the guides be covered with covers. By pressing the hoses and harnesses from the outside, it is possible to route them in a tidy fashion. Here, at this time, by routing power steering cables (not illustrated) through holes that are provided in the side surfaces of the axle brackets 63, it is possible to inhibit the cables from protruding outward at the time of routing.

Figure 8:
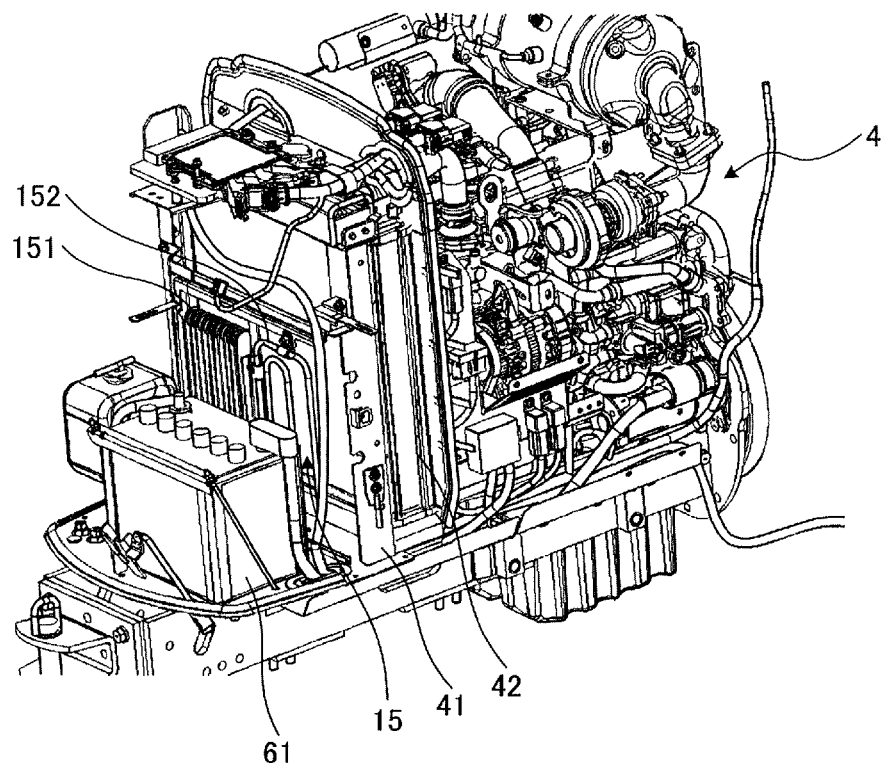
FIG. 8 is an explanatory view illustrating an example of a harness routing structure on the left side of the engine.
Figure 9:
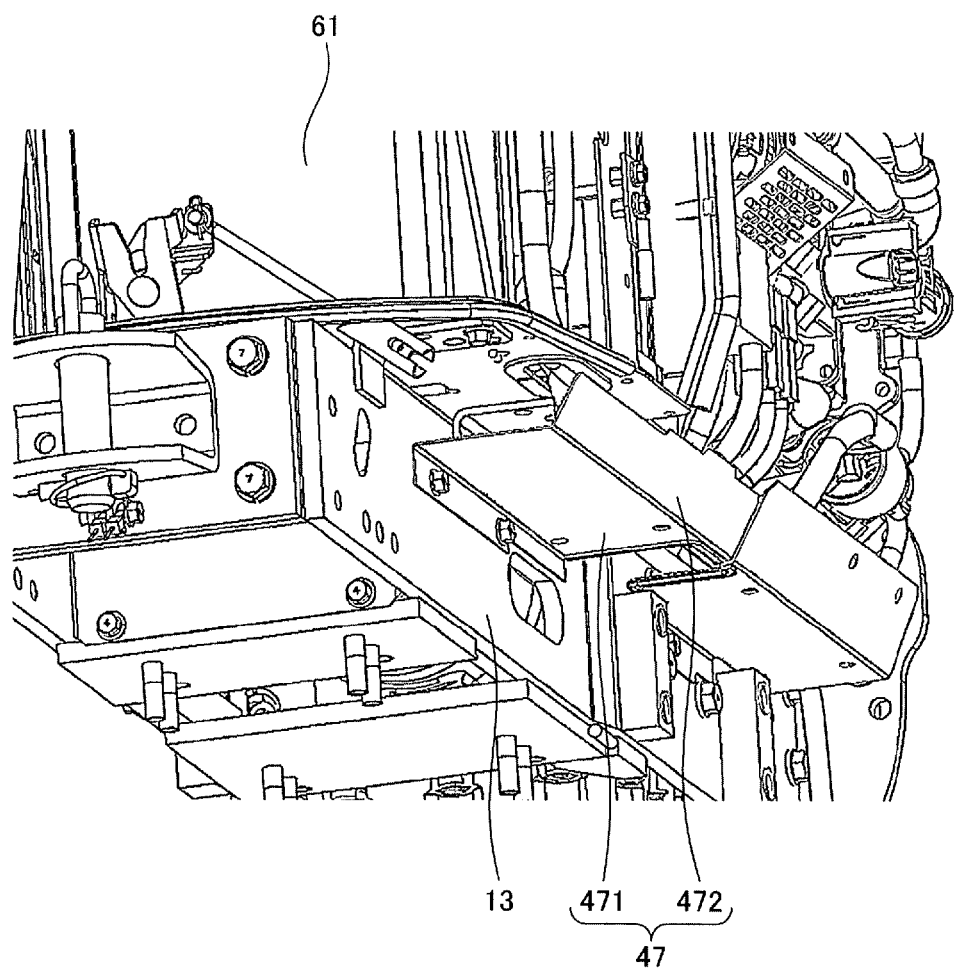
FIG. 9 is an explanatory view of a harness guide which is adapted to guide a harness.

FIG. 8 is an explanatory view illustrating an example of a harness routing structure on the left side of the engine 4. FIG. 9 is an explanatory view of a harness guide which is adapted to guide a harness. As the example of the harness routing structure on the left side of the engine 4, as illustrated in FIG. 8 and FIG. 9, a gutter-shaped holder 47 which includes a bottom surface 471 and left and right side surfaces 472 and has a substantially U-shape in cross section is mounted in such a way as to extend along the axle bracket 63, and the hoses and harnesses are routed inside this holder 47.

As illustrated in FIG. 9, since the holder 47 is divided into two front and rear sections, such a structure makes it easier to handle the holder at the time of manufacturing the holder and mounting it to the axle bracket 63. Note that, such a routing structure using this holder 47 is also applicable to the hoses and harnesses on the right side of the engine 4 as well as those on the left side as illustrated in the drawings.

Figure 10:
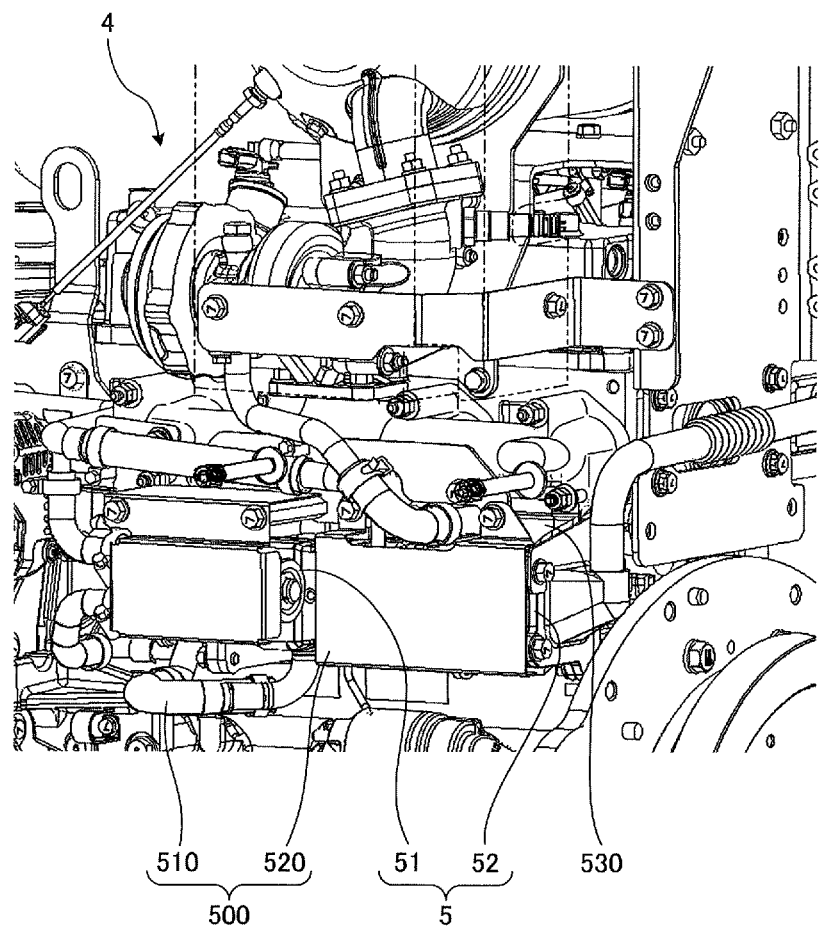
FIG. 10 is an explanatory view illustrating a state in which a cover is attached to an EGR device.

FIG. 10 is an explanatory view illustrating a state in which a cover is attached to the EGR system 5. The EGR system 5 illustrated in FIG. 1 is extremely high in temperature, and thus the EGR system 5 is covered with an EGR cover 500. Specifically, the EGR cover 500 is constituted in such a way that a valve cover 510 for covering an EGR valve 51 constituting the EGR system 5 and a cooler cover 520 for covering an EGR cooler 52 constituting the same are mounted integrally via a connecting plate 530.

By providing the EGR cover 500 described above, it is possible to prevent the various hoses and harnesses such as the hoses 16 from being accidentally brought into contact with the EGR valve 51 and the EGR cooler 52 directly and impaired by heat. Besides, it is also possible to prevent an operator and the like from getting burnt by accidentally touching them.

The following tractor is implemented by the embodiment described above.

(1) A tractor including a traveling body 1 which includes: front wheels 2 and rear wheels 3; and a connecting section 7 which is configured to connect a working machine to the traveling body, in which the traveling body 1 includes: a pair of left and right body frames 13, 13 which extends longitudinally; an engine 4 which is mounted on the body frames 13, 13 and works as a driving source of the front and rear wheels 2, 3 and the working machine; a base plate 14 which is provided on the body frames 13, 13; a fuel cooler 15 which is provided on the base plate 14; and hoses 16 which are connected to the fuel cooler 15 and routed, the base plate 14 has a hose insertion hole 140 into which the hoses 16 are inserted, and the hoses 16 pass through the hose insertion hole 140, extend below the base plate 14, and are routed toward the engine 4.

The above tractor enables the hoses 16 connected to the fuel cooler 15 to be routed while passing through a region between the left and right body frames 13, 13, and thereby enables adequate routing of these hoses easily without impairing its external appearance.

(2) The tractor described in the item (1) above, in which the hoses 16 are routed between: a steering cylinder 62 which is configured to steer the front wheels 2; and a crank pulley 44 which is provided in the engine 4, and a hose cover 64 is disposed between the hoses 16 and the crank pulley 44.

The above tractor makes it possible to enhance the effect brought by the item (1) above, and also possible to protect the hoses 16 against the rotation of the crank pulley 44 and thereby prevent breakage of the hoses 16.

(3) The tractor described in the item (2) above, in which a guide member 65 which is hung between the left and right body frames 13, 13 is provided between the engine 4 and the steering cylinder 62, and the hoses 16 are routed between the guide member 65 and the hose cover 64.

The above tractor makes it possible to enhance the effect brought by the item (2) above, and also possible to route the hoses 16 to the vicinity of the engine 4 adequately.

(4) The tractor described in any one of the items (1) to (3) above, further including a relay pipe 45 which is disposed in a lower part of a sidewall of the engine 4 and adapted to relay the hoses 16 and connect the hoses to the engine 4.

The above tractor makes it possible to enhance the effect brought by any one of the items (1) to (3) above, and also possible to shorten the length of the hoses 16 and thus reduce their cost.

Further effects and modifications can be easily derived by those skilled in the art. Thus, a wider form of the present invention is not limited to the specific details and the representative embodiment indicated and described above. Accordingly, various changes are possible without departing from the spirit and scope of the general concept of the invention defined by the appended claims and equivalents thereof.

What is claimed is:

1. A work vehicle comprising a traveling body which includes:
    a traveling device; and
    a connecting section configured to connect a working machine to the traveling body, wherein
    the traveling body includes:
        a pair of left and right body frames that extend longitudinally;
        an engine mounted on the body frames configured to work as a driving source of the traveling device and the working machine;
        a base plate provided on the body frames;
        a cooler provided on the base plate; and
        a hose connected to the cooler and routed,
    wherein the base plate has a hose insertion hole into which the hose is inserted,
    the hose passes through the hose insertion hole, extends below the base plate, and is routed toward the engine,
    the hose is routed between: a steering cylinder which is configured to steer the traveling device; and a crank pulley which is provided in the engine, and
    a hose cover is disposed between the hose and the crank pulley.

2. A work vehicle comprising a traveling body which includes:
    a traveling device; and
    a connecting section configured to connect a working machine to the traveling body, wherein
    the traveling body includes:
        a pair of left and right body frames that extend longitudinally;
        an engine mounted on the body frames configured to work as a driving source of the traveling device and the working machine;
        a base plate provided on the body frames;
        a cooler provided on the base plate; and
        a hose connected to the cooler and routed,
    wherein the base plate has a hose insertion hole into which the hose is inserted,
    the hose passes through the hose insertion hole, extends below the base plate, and is routed toward the engine,
    the work vehicle further comprising a relay pipe which is disposed in a lower part of a sidewall of the engine and adapted to relay the hose and connect the hose to the engine.

3. The work vehicle according to claim 2, wherein
    the hose is routed between: a steering cylinder which is configured to steer the traveling device; and a crank pulley which is provided in the engine, and
    a hose cover is disposed between the hose and the crank pulley.

4. The work vehicle according to claim 3, wherein
    a guide member which is hung between the left and right body frames is provided between the engine and the steering cylinder, and
    the hose is routed between the guide member and the hose cover.

5. The work vehicle according to claim 3, further comprising a relay pipe which is disposed in a lower part of a sidewall of the engine and adapted to relay the hose and connect the hose to the engine.

6. The work vehicle according to claim 4, further comprising a relay pipe which is disposed in a lower part of a sidewall of the engine and adapted to relay the hose and connect the hose to the engine.

7. The work vehicle according to claim 1, wherein
    a guide member which is hung between the left and right body frames is provided between the engine and the steering cylinder, and
    the hose is routed between the guide member and the hose cover.

8. The work vehicle according to claim 1, further comprising a relay pipe which is disposed in a lower part of a sidewall of the engine and adapted to relay the hose and connect the hose to the engine.

9. The work vehicle according to claim 7, further comprising a relay pipe which is disposed in a lower part of a sidewall of the engine and adapted to relay the hose and connect the hose to the engine.

* * * * *